US007172097B2

(12) United States Patent
Petit

(10) Patent No.: US 7,172,097 B2
(45) Date of Patent: Feb. 6, 2007

(54) FLUID PRODUCT DISPENSING PUMP

(75) Inventor: Ludovic Petit, Vitot (FR)

(73) Assignee: Valois S.A.S., Neubourg (FR)

( * ) Notice: Subject to any disclaimer, the term of this patent is extended or adjusted under 35 U.S.C. 154(b) by 0 days.

(21) Appl. No.: 10/494,483

(22) PCT Filed: Nov. 6, 2002

(86) PCT No.: PCT/FR02/03797
§ 371 (c)(1),
(2), (4) Date: Apr. 29, 2004

(87) PCT Pub. No.: WO03/039756

PCT Pub. Date: May 15, 2003

(65) Prior Publication Data

US 2005/0079072 A1 Apr. 14, 2005

(30) Foreign Application Priority Data

Nov. 7, 2001 (FR) .................................. 01 14407

(51) Int. Cl.
*G01F 11/00* (2006.01)

(52) U.S. Cl. .............. 222/189.09; 222/190; 222/321.6; 222/321.9

(58) Field of Classification Search ............. 222/321.2, 222/321.6, 321.9, 378, 385, 189.09, 190
See application file for complete search history.

(56) References Cited

U.S. PATENT DOCUMENTS 2,802,490 A 8/1957 Ward
5,147,073 A * 9/1992 Cater ...................... 222/321.9
5,217,148 A * 6/1993 Cater ...................... 222/321.2
5,813,571 A * 9/1998 Gaucher ...................... 222/95
6,119,899 A * 9/2000 Iizuka et al. ................ 222/190
6,237,814 B1 * 5/2001 Blyler et al. ........... 222/189.09
6,244,472 B1 * 6/2001 Hennemann ........... 222/189.09
6,460,738 B1 * 10/2002 Petit ...................... 222/189.09

FOREIGN PATENT DOCUMENTS

GB 1 524 293 A 9/1978
GB 2 361 229 A 10/2001

* cited by examiner

*Primary Examiner*—Joseph A Kaufman
(74) *Attorney, Agent, or Firm*—Sughrue Mion, PLLC

(57) ABSTRACT

A fluid-dispenser pump having a pump body (10) containing a measuring chamber (20) defined between an upper piston (30) sliding in an upper portion (11) of the pump body (10), and a lower piston (40) sliding in a lower portion (12) of the pump body (10). The lower piston (40) co-operates with a spring (50) disposed in the lower portion (12) of the pump body (10). The spring (50) is isolated from any contact with the fluid, and the lower portion (12) of the pump body includes an air-intake (15) enabling air to be admitted and/or expelled during actuation of the pump. Isolation is provided to prevent fluid from penetrating into the air-intake (15).

20 Claims, 1 Drawing Sheet

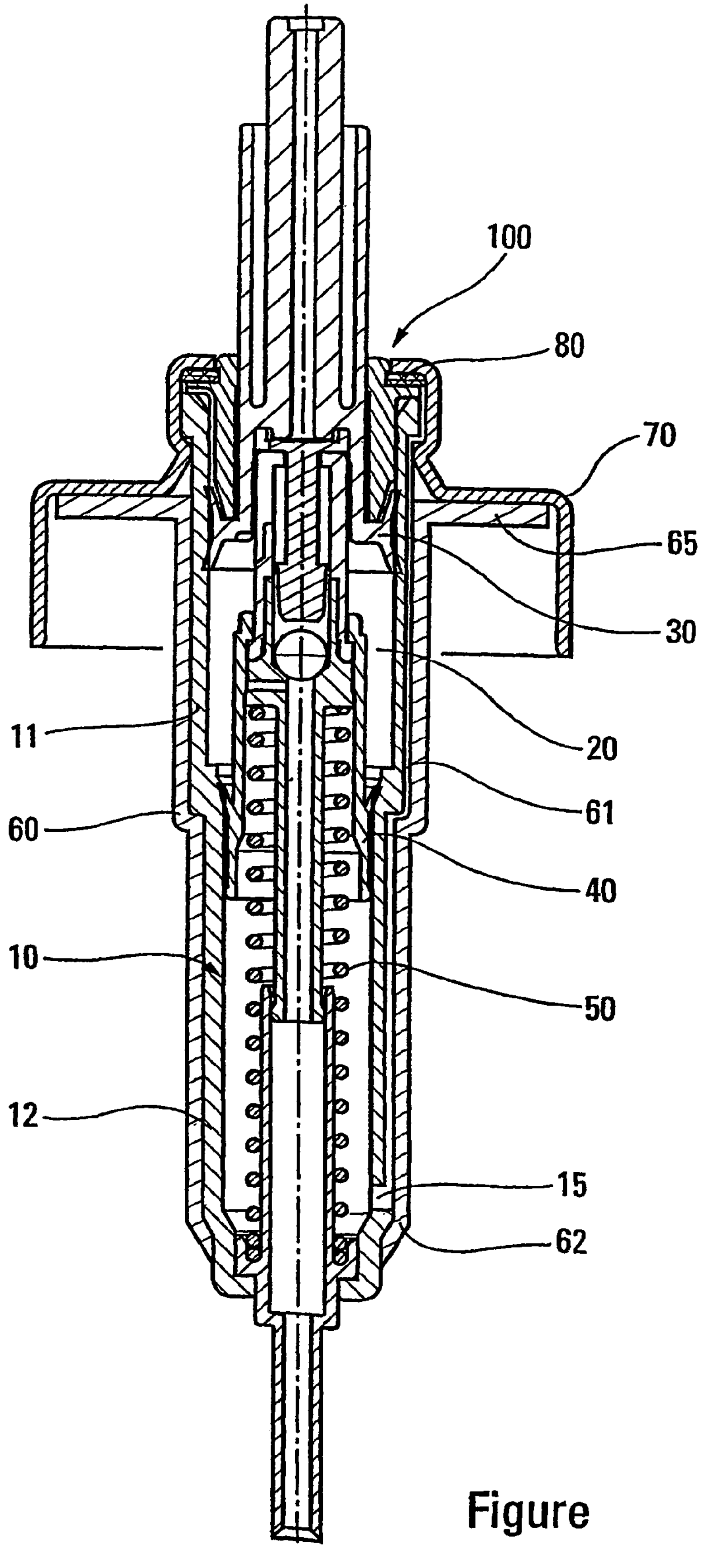
Figure

FLUID PRODUCT DISPENSING PUMP

FIELD OF THE INVENTION

The present invention relates to a fluid-dispenser pump, and to a fluid dispenser device incorporating such a pump.

BACKGROUND OF THE INVENTION

Fluid-dispenser pumps are well known in the prior art. The present invention relates more particularly to pumps in which the return spring of the pump is not in contact with the fluid dispensed by the pump. The spring is therefore disposed in a chamber inside the pump body, which chamber is isolated from the fluid, but contains air. During actuation of the pump, the moving element of the pump which co-operates with the spring is displaced, thereby compressing the spring, and the presence of the air can pose a problem with regard to the ease of use or the reliability of the pump.

SUMMARY OF THE INVENTION

An object of the present invention is therefore to provide a fluid-dispenser pump which is safe to use and reliable, while being simple and inexpensive to manufacture and to assemble.

The present invention therefore provides a fluid-dispenser pump comprising a pump body containing a measuring chamber defined between an upper piston sliding in an upper portion of the pump body, and a lower piston sliding in a lower portion of the pump body, the lower piston co-operating with a spring disposed in the lower portion of the pump body, the pump being characterized in that the spring is isolated from any contact with the fluid, the lower portion of the pump body including air-intake means enabling air to be admitted and/or expelled during actuation of the pump, isolation means being provided to prevent fluid from penetrating into the air-intake means.

The air-intake means are advantageously formed by a hole made in the lower portion of the pump body.

The isolation means advantageously comprise an outer casing disposed around the pump body.

An air passage is advantageously defined between the casing and the pump body, the air passage being connected to the vent hole of the pump.

The vent hole advantageously includes a filter designed to filter the incoming air.

The casing is advantageously fitted around the pump body, the air passage being defined by at least one groove formed in the outside wall of the pump body and/or the inside wall of the casing.

The casing advantageously includes a radial flange providing sealing with a reservoir onto which the pump is assembled.

The radial flange advantageously forms a neck gasket.

The casing advantageously includes a sleeve providing sealing with the outside wall of the pump body.

Advantageously, the sleeve is elastically deformable so as to allow air coming from the inside of the pump body to pass through the air-intake means.

The present invention also provides a fluid dispenser device including a pump as defined above, the pump being mounted on a reservoir by means of a fixing ring or cap.

BRIEF DESCRIPTION OF THE DRAWINGS

Other characteristics and advantages of the present invention appear more clearly from the following detailed description of an advantageous embodiment thereof, made with reference to the accompanying drawing, and given by way of non-limiting example, in which the sole Figure is a diagrammatic cross-section view of a dispenser pump constituting an embodiment of the present invention, in the rest position.

DETAILED DESCRIPTION OF THE INVENTION

The pump of the present invention comprises a pump body 10 which defines a measuring chamber 20 between an upper piston 30 and a lower piston 40. The upper piston 30 slides in an upper portion 11 of the pump body, and the lower piston 40 slides in a lower portion 12 of the pump body. Preferably, the lower piston 40 is floatingly mounted inside the pump body and co-operates with a spring 50 which is mounted on an end wall of the pump body 10 and which forms the return spring of the pump.

In the invention, the spring 50 is completely isolated from the fluid which is dispensed by the pump. This means that no fluid penetrates into the spring chamber, i.e. into the lower portion of the pump body in which the spring is situated. In order to ensure safe and reliable operation of the pump, the present invention provides air-intake means 15 in the lower portion 12 of the pump body, to enable air to be admitted and/or expelled during actuation of the pump. Thus, when the lower piston 40 is displaced downwards inside the lower portion of the pump body, air can be expelled via the air-intake means 15, whereas when the lower piston rises, air can then be sucked in through said air-intake means 15. The air-intake means 15 are advantageously provided in the form of a hole formed in the lower portion 12 of the pump body.

In the invention, isolation means 60 are provided so as to prevent the fluid from penetrating into the lower portion of the pump body, so as to guarantee that the spring 50 does not come into contact with the fluid. The complete absence of contact between the generally metal spring and the fluid to be dispensed is particularly advantageous for certain pharmaceuticals which risk being spoilt by coming into contact with the spring.

The isolation means 60 are advantageously made in the form of an outer casing which is fitted around the pump body, and which covers the hole 15 so as to prevent the fluid from penetrating into said pump body. The outer casing is advantageously identical in shape to the pump body, such that on being fitted said casing comes into contact with the entire surface of the wall, with an air passage 61 nevertheless being formed between the pump body 10 and the outer casing 60, the air passage being connected to the vent hole 100 of the pump. In the example shown in the figure, the vent hole is disposed in the upper portion of the pump, at the pump gasket 80 which provides sealing between the pump and the fixing ring or cap 70 for mounting the pump on a reservoir (not shown). In the example shown, the gasket 80 is a filter gasket, i.e. the air which enters into the pump in order to replace the volume of fluid that has been dispensed, passes through said filter 80, which removes any bacteria and/or impurities which would risk spoiling the quality of the fluid.

The casing 60 advantageously includes a radial flange 65 which is designed to provide sealing with the neck of the reservoir (not shown). Said radial flange 65 can preferably even form the neck gasket of the pump. In this case, however, the vent hole 100 is connected directly to the air passage 61 formed between the pump body and the outer casing 60, and it is therefore necessary to provide air-flow means enabling said vent air to penetrate into the pump. This is preferably achieved by means of a sleeve 62 preferably formed at the bottom end of the outer casing 60, said sleeve providing firstly sealing with the outside wall of the pump body 10, but being elastically deformable so as to allow the vent air to pass.

The present invention thus makes it possible to guarantee the complete absence of contact between the return spring of the pump 50 and the fluid, while enabling the pump to operate safely and reliably since the air contained in the chamber of the spring 50 can flow freely as a function of the displacement of the lower piston 40. In parallel, the isolation means, in particular the outer casing, ensures sealing against fluid coming into contact with the spring, such that the objectives of the present invention are achieved by this very simple and inexpensive means constituted by the casing 60. In its embodiment shown in the figure, in which it also forms the neck gasket 65 by means of its top radial flange, the present invention also limits the number of component parts required in order to achieve the objective of the invention.

Although the invention is described above with reference to a particular embodiment thereof, the present invention is not limited to that embodiment, but any modifications could be applied thereto by the person skilled in the art, without going beyond the ambit of the present invention as defined by the accompanying claims.

The invention claimed is:

1. A fluid-dispenser pump comprising a pump body (10) comprising a measuring chamber (20) defined between an upper piston (30) sliding in an upper portion (11) of the pump body (10), and a lower piston (40) sliding in a lower portion (12) of the pump body (10), said lower piston (40) co-operating with a spring (50) disposed in said lower portion (12) of the pump body (10), wherein the spring (50) is isolated from any contact with the fluid, the lower portion (12) of the pump body including air-intake means (15) enabling air to be admitted or expelled during actuation of the pump, isolation means (60) being provided to prevent fluid from penetrating into said air-intake means (15); and wherein the upper portion of the pump body is configured to co-operate with a fixing ring and the lower portion of the pump body is connected to the upper portion and is configured to extend downwardly inside a reservoir.

2. A pump according to claim 1, in which said air-intake means (15) are formed by a hole made in the lower portion (12) of the pump body (10).

3. A pump according to claim 1, in which said isolation means (60) comprise an outer casing disposed around said pump body (10).

4. A pump according to claim 3, in which an air passage (61) is defined between said casing (60) and said pump body (10), said air passage (61) being connected to a vent hole (100) of the pump.

5. A pump according to claim 4, in which the vent hole (100) includes a filter (80) designed to filter the incoming air.

6. A pump according to claim 4 in which said casing (60) is fitted around the pump body (10), said air passage (61) being defined by at least one groove formed in an outside wall of the pump body (10) or an inside wall of the casing (60).

7. A pump according to claim 3, in which said casing (60) includes a radial flange (65) providing sealing with the reservoir onto which the pump is assembled.

8. A pump according to claim 7, in which said radial flange (65) forms a neck gasket.

9. A pump according to claim 3, in which said casing (60) includes a sleeve (62) providing sealing with an outside wall of the pump body (10).

10. A pump according to claim 9, in which said sleeve (62) is elastically deformable so as to allow air coming from inside of the pump body (10) to pass through said air-intake means (15).

11. A fluid dispenser device including a pump according to claim 1, said pump being mounted on the a reservoir by means of the fixing ring.

12. A fluid-dispenser pump for dispensing a fluid from a reservoir, comprising:

a pump body comprising a measuring chamber for the fluid to be dispensed and defined by an upper piston sliding in an upper portion of the pump body and a lower piston sliding in a lower portion of the pump body;

a spring disposed in the lower portion of the pump body, the spring cooperating with the lower piston, wherein the spring is isolated from contact with the fluid;

an air-intake through which air is admitted or expelled from the pump during actuation of the pump; and a casing that prevents fluid from penetrating into the air-intake; and wherein the upper portion of the pump body is configured to co-operate with a fixing ring and the lower portion of the pump body is connected to the upper portion and is configured to extend downwardly inside the reservoir.

13. The fluid-dispenser pump according to claim 12, wherein the air-intake is located in the lower portion of the pump body.

14. The fluid-dispenser pump according to claim 12, wherein the pump comprises a vent hole connected to an air passage, and wherein the air passage is defined between the casing and the pump body.

15. The fluid-dispenser pump according to claim 12, wherein the casing is fitted around the pump body and the air passage is defined by at least one groove formed in an outside wall of the pump body or an inside wall of the casing.

16. The fluid-dispenser pump according to claim 12, wherein the casing comprises a radial flange for providing a seal with the reservoir onto which the pump is assembled; and wherein the radial flange is a neck gasket.

17. A fluid dispenser device comprising the pump according to claim 12, the reservoir and the fixing ring, and wherein the pump is mounted on the reservoir by the fixing ring such that the upper portion of the pump body couples to the fixing ring and the lower portion of the pump body extends downwardly inside the reservoir.

18. A fluid-dispenser pump for dispensing a fluid from a reservoir, comprising:

a pump body comprising a measuring chamber for the fluid to be dispensed and defined by an upper piston sliding in an upper portion of the pump body and a lower piston sliding in a lower portion of the pump body;

a spring disposed in the lower portion of the pump body, the spring cooperating with the lower piston, wherein the spring is isolated from contact with the fluid;

an air-intake through which air is admitted or expelled from the pump during actuation of the pump; and a casing that prevents fluid from penetrating into the air-intake; and wherein the casing is disposed outside and around the pump body.

19. A fluid-dispenser pump for dispensing a fluid from a reservoir, comprising:

a pump body comprising a measuring chamber for the fluid to be dispensed and defined by an upper piston sliding in an upper portion of the pump body and a lower piston sliding in a lower portion of the pump body;

a spring disposed in the lower portion of the pump body, the spring cooperating with the lower piston, wherein the spring is isolated from contact with the fluid;

an air-intake through which air is admitted or expelled from the pump during actuation of the pump; and a casing that prevents fluid from penetrating into the air-intake; and wherein the casing comprises a sleeve in sealing contact with an outside wall of the pump body.

20. The fluid-dispenser pump according to claim 19, wherein the sleeve is elastically deformable so as to allow air coming from an inside of the pump body to pass through the air-intake.

* * * * *

UNITED STATES PATENT AND TRADEMARK OFFICE

CERTIFICATE OF CORRECTION

PATENT NO. : 7,172,097 B2
APPLICATION NO. : 10/494483
DATED : February 6, 2007
INVENTOR(S) : Ludovic Petit It is certified that error appears in the above-identified patent and that said Letters Patent is hereby corrected as shown below:

Title Page

Please amend as follows:

(86) § 371 (c)(1), (2), (4) Date: Please delete "Apr. 29, 2004" and insert therefor --Apr. 30, 2004--

Signed and Sealed this

Eighth Day of April, 2008

JON W. DUDAS
*Director of the United States Patent and Trademark Office*